US011042727B2

(12) United States Patent
Kapinos et al.

(10) Patent No.: US 11,042,727 B2
(45) Date of Patent: Jun. 22, 2021

(54) FACIAL RECOGNITION USING TIME-VARIANT USER CHARACTERISTICS

(71) Applicant: Lenovo (Singapore) Pte. Ltd., Singapore (SG)

(72) Inventors: Robert J. Kapinos, Durham, NC (US); Robert Norton, Raleigh, NC (US); Russell Speight VanBlon, Raleigh, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 95 days.

(21) Appl. No.: 16/587,994

(22) Filed: Sep. 30, 2019

(65) Prior Publication Data

US 2021/0097261 A1    Apr. 1, 2021

(51) Int. Cl.
| *G06K 9/00* | (2006.01) |
| *G06K 9/62* | (2006.01) |
| *G06N 3/08* | (2006.01) |
| *G06N 3/04* | (2006.01) |

(52) U.S. Cl.
CPC ..... *G06K 9/00288* (2013.01); *G06K 9/00926* (2013.01); *G06K 9/6256* (2013.01); *G06N 3/04* (2013.01); *G06N 3/08* (2013.01)

(58) Field of Classification Search
CPC ............ G06K 9/00288; G06K 9/6256; G06K 9/00926; G06N 3/04; G06N 3/08
USPC ........................................................ 382/118
See application file for complete search history.

(56) References Cited

U.S. PATENT DOCUMENTS

| 7,321,670 B2* | 1/2008 | Yoon ................. G06K 9/00268 382/118 |
| 2007/0122005 A1* | 5/2007 | Kage ................. G06K 9/00275 382/115 |
| 2008/0118113 A1* | 5/2008 | Jung .................... G06K 9/0061 382/117 |
| 2013/0247175 A1* | 9/2013 | Nechyba ................ G06F 21/32 726/19 |

* cited by examiner

*Primary Examiner* — Juan A Torres
(74) *Attorney, Agent, or Firm* — John M. Rogitz; John L. Rogitz (57) ABSTRACT

In one aspect, a device may include at least one processor and storage accessible to the at least one processor. The storage may include instructions executable by the at least one processor to receive input from a camera indicating a first face of a first user. The instructions may also be executable to access first facial recognition data indicating one or more enrolled faces and to access second facial recognition data indicating time-variant data, where the second facial recognition data may not establish non-time-variant face data. The instructions may then be executable to select first time-variant data associated with the first user from the second facial recognition data and to authenticate the first user based on the first time-variant data and enrolled face data for the first user identified from the first facial recognition data.

20 Claims, 6 Drawing Sheets

SETTINGS

☐ ENABLE USE OF TIME-VARIANT DATA ～602
☐ ONLY USE PRIMARY DATABASE IF NO ～604
    LOGIN FOR THRESHOLD TIME

606～ SET THRESHOLD TIME: [7] DAYS  /608

USE:  ☐ FACIAL HAIR  /610
        ☐ SCALP HAIR
        ☐ ELECTRONIC HEADSETS
        ☐ EYE GLASSES
        ☐ WRINKLES
        ☐ SKIN TAN/TONE

FIG. 6

FACIAL RECOGNITION USING TIME-VARIANT USER CHARACTERISTICS

FIELD

The present application relates to technically inventive, non-routine solutions that are necessarily rooted in computer technology and that produce concrete technical improvements.

BACKGROUND

As recognized herein, current facial recognition systems suffer from human growth divergence. For example, as a user's hair grows, the system begins to need a lower confidence level to be effective for authentication. Long-term use leads to an even lower security level over time as the database accumulates many variations and applies them at each login, sometimes even leading to the inability of the system to discriminate. There are currently no adequate solutions to the foregoing computer-related, technological problem.

SUMMARY

Accordingly, in one aspect a device includes at least one processor and storage accessible to the at least one processor. The storage includes instructions executable by the at least one processor to receive input from a camera indicating a first face of a first user. The instructions are also executable to access a first facial recognition database including non-time-variant facial data from facial recognition enrollment of one or more users and to access a second facial recognition database indicating time-variant data related to one or more faces and indicating timestamps for the time-variant data. The instructions are also executable to identify a current time metric and to select first time-variant data associated with the first user from the second facial recognition database based on the current time metric and a first timestamp indicated in the second facial recognition database. The instructions are further executable to attempt to authenticate the first user based on the first time-variant data and non-time-variant enrolled facial data for the first user identified from the first facial recognition database.

In some examples, the instructions may be executable by the at least one processor to, prior to accessing the second facial recognition database, attempt to authenticate the first user using the input from the camera and the first facial recognition database but not the second facial recognition database. Responsive to authenticating the first user to a threshold level of confidence using the first facial recognition database but not the second facial recognition database, the instructions may be executable to permit the first user access to at least one resource. Responsive to not authenticating the first user to the threshold level of confidence using the first facial recognition database but not the second facial recognition database, the instructions may be executable to access the second facial recognition database, identify the current time metric, select the first time-variant data, and attempt to authenticate the first user based on the first time-variant data and the non-time-variant enrolled face data for the first user identified from the first facial recognition database.

In some implementations, the second facial recognition database may not include templates of faces or non-time-variant facial enrollment data, and the second facial recognition database may indicate facial features as differences related to templates of faces or enrolled facial data in the first facial recognition database.

Additionally, the first time-variant data may relate to facial hair, scalp hair, electronic headsets, eyeglasses, wrinkles, injury-related skin changes, skin tan, skin tone, and/or pigmented lesions.

In some examples, the device may even include the camera.

Also in some examples, the instructions may be executable by the at least one processor to, responsive to successful authentication of the first user, train at least one artificial neural network used for facial recognition using second time-variant data related to the face of the first user as indicated in the input from the camera. In some implementations, the instructions may then be executable to prune third time-variant data from the second facial recognition database, with the third time-variant data being related to the first user. The third time-variant data may be pruned responsive to authentication of the first user based on the first time-variant data. Additionally or alternatively, the third time-variant data may be pruned based on the third time-variant data being older than a threshold amount of time, based on the third time-variant data not being used for authentication for at least a threshold amount of time, and/or based on the third time-variant data being dissimilar from the second time-variant data by a threshold distance.

In another aspect, a method includes receiving input from a camera indicating a first face of a first user, accessing first facial recognition data indicating one or more enrolled faces, and accessing second facial recognition data indicating time-variant data. The second facial recognition data does not establish enrolled face data. The method also includes selecting first time-variant data associated with the first user from the second facial recognition data based on a current time. The method then includes authenticating the first user based on the first time-variant data and non-time-variant enrolled face data for the first user identified from the first facial recognition data.

In some implementations, the method may include, based on identifying that the first user has not been authenticated for at least a threshold amount of time, attempting to authenticate the first user using the non-time-variant enrolled face data for the first user but not the first time-variant data.

Also, in some implementations, the method may include, responsive to the authenticating of the first user, adding second time-variant data identified from the input from the camera to the second facial recognition data.

In still another aspect, at least one computer readable storage medium that is not a transitory signal includes instructions executable by at least one processor to receive input from a camera indicating a first face of a first user. The instructions are also executable to access first facial recognition data indicating one or more enrolled faces and to access second facial recognition data indicating time-variant data. The second facial recognition data does not establish non-time-variant face data. The instructions are also executable to select first time-variant data associated with the first user from the second facial recognition data and then to authenticate the first user based on the first time-variant data and enrolled face data for the first user identified from the first facial recognition data.

The details of present principles, both as to their structure and operation, can best be understood in reference to the accompanying drawings, in which like reference numerals refer to like parts, and in which:

DETAILED DESCRIPTION

The present application discloses an improved facial recognition engine. Among other things, the present application discloses a biometric recognition database with two parts. One may be a baseline part that contains face templates and/or enrolled faces for the facial shape, features, and recognition points for faces that have been previously enrolled with the system by respective users during a facial recognition registration process. The process itself may include a user presenting his or her face to a camera for a period of time, possibly more than once, until the system has generated/recognized sufficient data points on the features and contours of the user's face to recognize it later under a variety of circumstances. The data points may then be enrolled in the first part for subsequent face identifications of the user for authentication and other purposes. The data points may thus be enrolled into the baseline part as non-time-variant data that alone may be sufficient to identify the user at a later time via facial recognition based on the non-time-variant data alone.

The second part may contain enhancements to the baseline part such as coloration, hair patterns, wrinkle patterns, injury-related skin changes, etc. that can change over time. The second part's data points may be stored along with associated timestamps so they can be applied selectively by time of acquisition even though those data points might not have been provided during the formal registration process but instead collected during a subsequent facial recognition phase itself.

The engine may also have a classifier that can distinguish common time-based deviations such as hair growth, skin tanning, wrinkling, and injury-related skin changes such as a cut from facial hair shaving. This classifier may be used to route such deviations to the second database during on-the-fly login training.

Furthermore, in some examples the engine may do training every time a face is successfully recognized. The training may consist of various on-the-fly training processes, including the process of classifying and updating the time-variant parts with the user's facial changes since the last successful login.

Additionally, the detection data may be pruned, particularly when facial detection is done on a frequent basis. Thus, in certain examples matching may be done with data consisting only of the baseline and the most-recent time-variant adjustments. Older time-based adjustments may be ignored.

Moreover, some implementations of present principles may use an adaptive algorithm where if the user has not logged in for a certain time period, only the base biometric database may be used for higher security. Some embodiments may even use the time-variant data in an even more "smart" way. For example, if the time-variant facial data has an identifiable pattern such as a user getting a haircut every four weeks or the user consistently presenting with darker skin during the summer and the user has not logged in/been authenticated for a while, the most-timely variant dataset may be added to the baseline and used for authentication at another similar time.

Prior to delving further into the details of the instant techniques, with respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general-purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
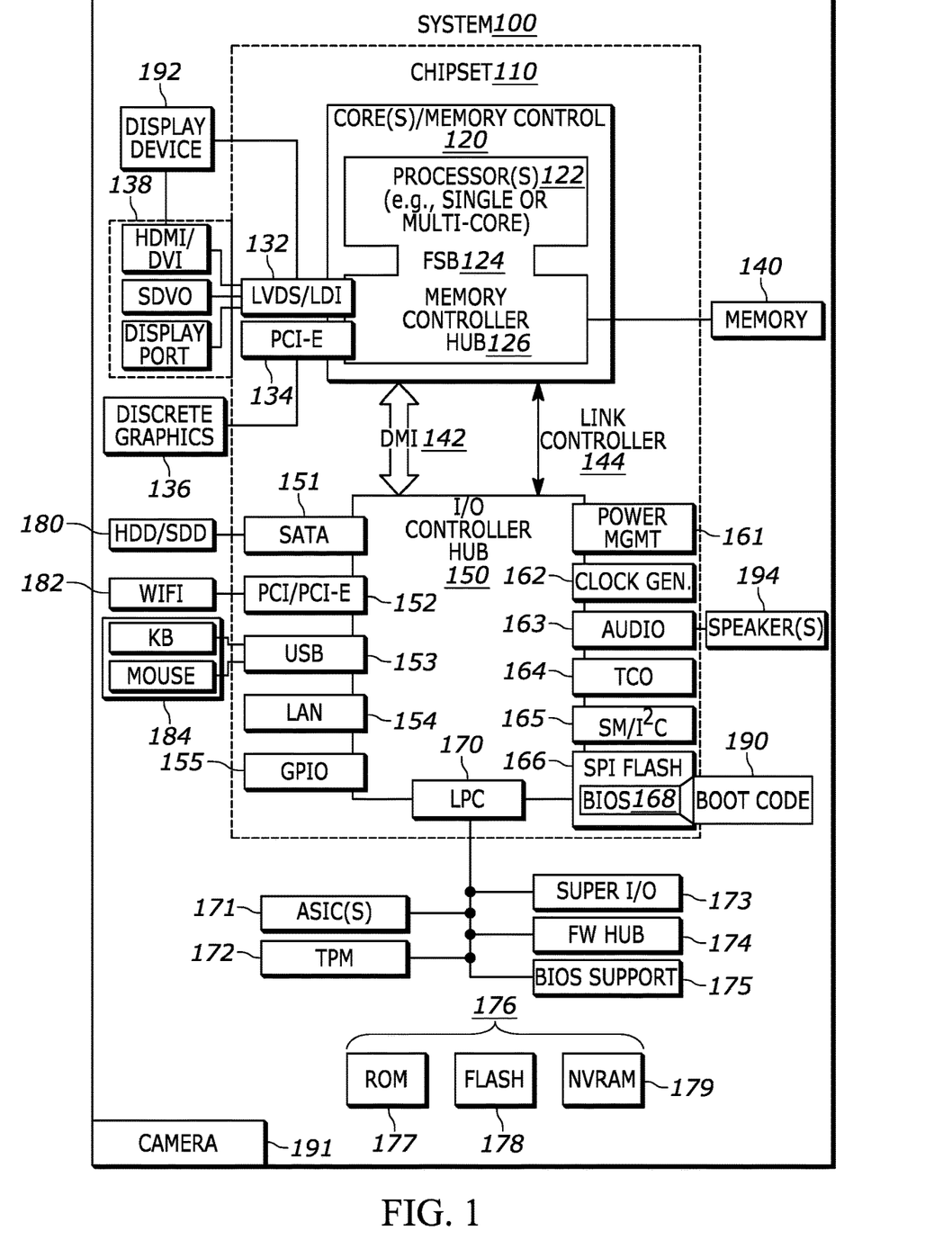
FIG. 1 shows a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include a camera 191 that gathers one or more images and provides input related thereto to the processor 122 for facial recognition consistent with present principles. The camera 191 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Additionally, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Still further, the system 100 may include an audio receiver/microphone that provides input from the microphone to the processor 122 based on audio that is detected, such as via a user providing audible input to the microphone. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
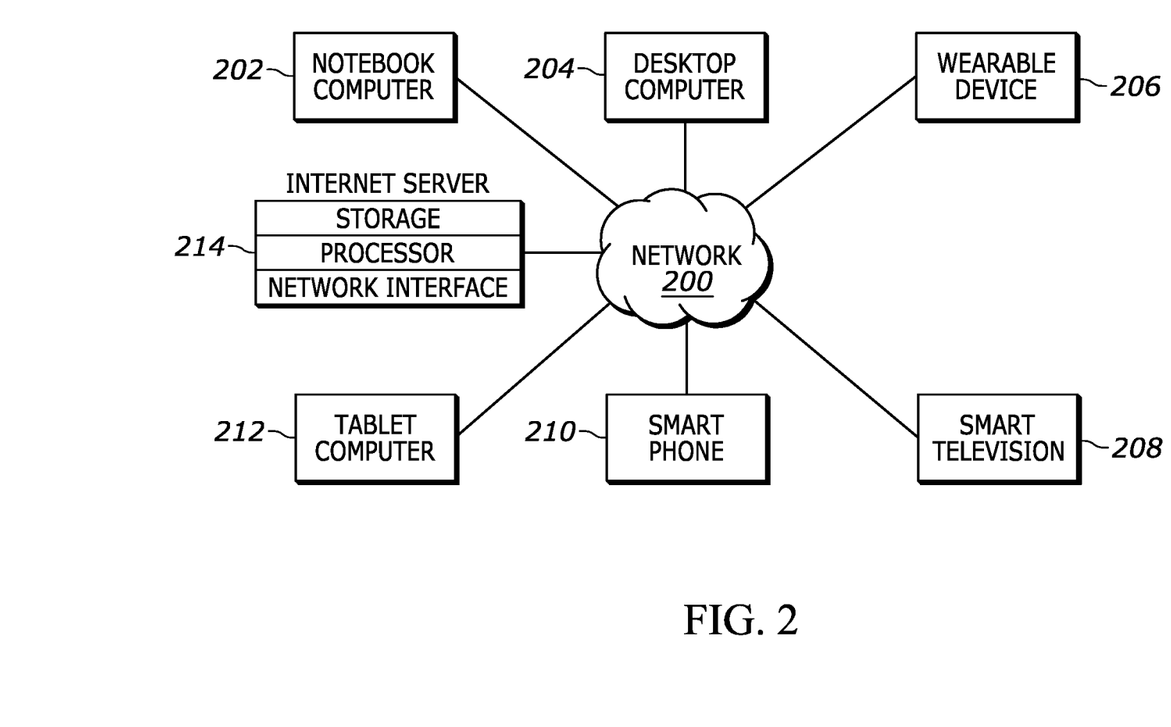
FIG. 2 shows a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
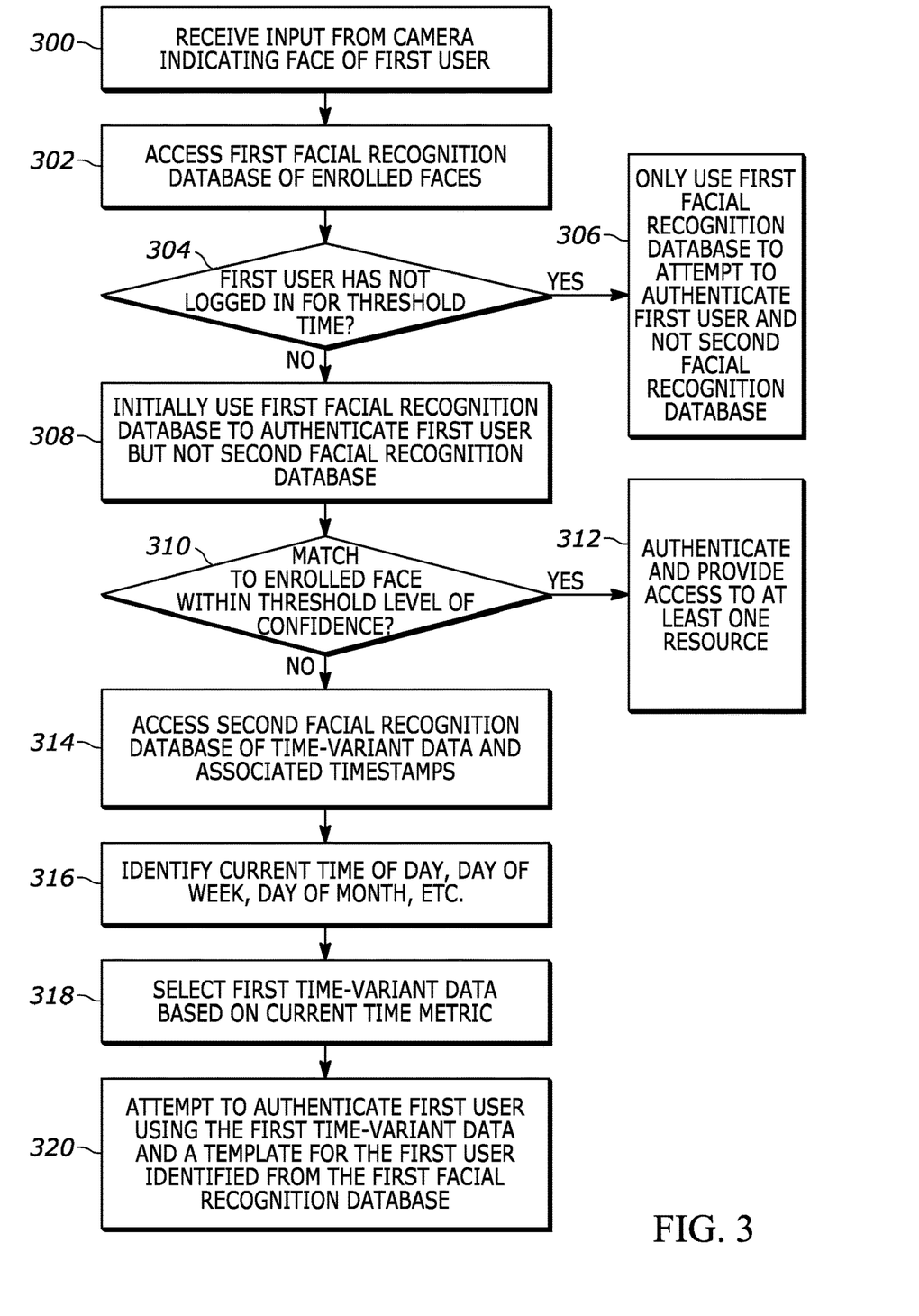
FIGS. 3 and 4 show flow charts of example algorithms for facial recognition consistent with present principles.

Referring to FIG. 3, it shows example logic that may be executed by a device such as the system 100 in accordance with present principles to attempt to authenticate a first user via facial recognition. The logic of FIG. 3 may be executed by a server and/or an end-user's device such as a smart phone, for example. Beginning at block 300, the device may receive input from a camera indicating the face of the user. The camera may be disposed on the device itself (e.g., if an end-user device) or otherwise in communication with the device.

From block 300 the logic may then proceed to block 302. At block 302 the device may access a first facial recognition database that stores face recognition base templates and/or enrolled faces for one or more users based on those users previously performing a setup process for facial recognition. Also, at block 302, the device may determine one or more potential matches of the first user's face as indicated in the camera input with one or more base templates or enrolled face data in the first facial recognition database to a first threshold level of confidence. In doing so, the device may determine the potential identity of the first user. From block 302 the device may then proceed to decision diamond 304.

At diamond 304 the device may determine whether the potentially matched first user has not logged in for at least a threshold amount of time as may be specified by a system administrator or developer. For example, the threshold amount of time may be one week or one month.

A determination at diamond 304 that the first user has not logged in for the threshold amount of time may cause the logic to proceed to block 306. At block 306 the device may only use the first racial recognition database and its enrolled faces to attempt to authenticate the first user via matching the first user's face as indicated in the camera input to a base template/enrolled face stored in the first database. This may be done using the first database alone, rather than also using a second facial recognition database as will be discussed in greater detail below. If desired, a second form of authentication may also be used at block 306, such as fingerprint recognition or entry of a code that was emailed or texted to the first user.

However, first referring back to diamond 304, note that a determination that the first user has logged in within the threshold amount of time may cause the logic to proceed to block 308 rather than block 306. At block 308 the device may then initially use the first facial recognition database and its base templates/enrolled faces to attempt to match the first user's face as indicated in the camera input to a base template or enrolled face in the first facial recognition database, thus still not using the second facial recognition database at this point.

From block 308 the logic may then proceed to decision diamond 310. At diamond 310 the device may determine whether, based on the attempted match performed at block 308, a match of the user's face as indicated in the camera input has been made to at least one base template or enrolled face from the first facial recognition database to a second threshold level of confidence. The second threshold level of confidence may be higher than the afore-mentioned first level of confidence to provide more-secure authentication based on the second level of confidence. For example, the first level of confidence may be a statistical level of confidence of seventy percent, while the second level of confidence may be a statistical level of confidence of ninety percent. Additionally, note that both the first and second levels of confidence may be specified by a system administrator or developer.

An affirmative determination at diamond 310 may cause the logic to proceed to block 312 where the device may authenticate the first user responsive to the first user's face as indicated in the camera input matching one of the base templates or enrolled face data in the first database to the second level of confidence. However, a negative determination at diamond 310 may instead cause the logic to proceed to block 314.

At block 314 the device may access a second facial recognition database, which may be a distinct database separate from the first facial recognition database and stored at a separate storage location or may be a distinct part of a same database also housing the first facial recognition database. The second facial recognition database may include time-variant data related to one or more users along with associated timestamps, e.g., for when the respective time-variant data was collected and/or when the respective time-variant data is likely to apply in the future based on past collection. The time-variant data itself may not establish one or more facial recognition templates or enrolled faces in its own right but may include data related to various aspects of users that have been identified in the past. Respective portions of the time-variant data for various users may also indicate relationships to various base templates/enrolled faces for the same respective users in the first facial recognition database.

As for the time-variant data itself, it may relate to and indicate a number of things. For instance, the time-variant data may indicate particular facial hair arrangements of users exhibited by those users at various times in the past while authenticating. The time-variant data may also indicate scalp hair arrangements/haircuts of users exhibited by those users at various times in the past while authenticating. Still further, the time-variant data may indicate electronic headsets worn by users at various times in the past while authenticating (e.g., as identified via object recognition) and eyeglasses worn by users at various times in the past while authenticating (as also might be recognized via object recognition). As other examples, the time-variant data may indicate wrinkles on the users' faces exhibited at various times in the past while authenticating, injury-related skin changes such as facial cuts from facial hair shaving, and/or skin tans or tones exhibited by users at various times in the past while authenticating. Skin lesions such as freckles may also be indicated in the time-variant data. In some examples, each type or class of time-variant data for each user may even be stored separately in the second facial recognition database from other types or classes for the same user and for different users. Additionally each type or class of time variant-data for each user may be associated with a timestamp indicating a date and time at which the respective time-variant data was received from a camera and/or used for authentication in the past (and even a date/time when the time-variant data might apply again).

From block 314 the logic may then proceed to block 316. At block 316 the device may identify a current time metric, such as a current time of day, a current day of the week, a current day of the month, a current day of the year, etc. From block 316 the logic may then proceed to block 318. At block 318 the device may, based on the identified current time metric, select first time variant-data of one or more types that are associated in the second facial recognition database with the potentially identified user. For example, the first time-variant data may be selected based on it being timestamped with a similar time, e.g., a same time of day, a same day of the week, a same day of the month, a same day of the year, or another same recurring time (e.g., a two-week interval).

From block 318 the logic may then move to block 320. At block 320 the device may attempt to authenticate the first user using the first time-variant data and a base template or enrolled face data for the first user identified from the first facial recognition database. For example, at block 320 the device may overlay facial hair points or scalp hair points from the first time-variant data on the base template or enrolled face and then attempt to match the first user's face as indicated in the input from the camera to the composite face of the first user's face established by the base enrolled face and the first time-variant point overlay. As another example, at block 320 the device may take the enrolled face and then make adjustments to it based on the first time-variant data to establish a face template or derivative face to use for comparison to the first user's face as indicated in the input from the camera.

Providing a few examples as applied to particular types of time-variant data, datapoints for a beard and a short haircut for the first user's scalp hair may be applied to the first user's base template or enrolled face for authentication every second Monday in instances where the system determines that the user gets a haircut and trims his beard every second Monday.

Datapoints for an electronic Bluetooth headset, an augmented reality headset, smart eye glasses, and/or traditional non-electronic eye glasses as worn by the first user in a previous instance may also be applied to the first user's base template or enrolled face for authentication during business hours (Monday through Friday, 8:00 a.m. to 5:00 p.m.) where the system determines that the user wears those items during business hours.

Datapoints for wrinkles on the first user's face may also be applied to the first user's base template or enrolled face data, where the wrinkles may have been identified during an authentication after the face was enrolled but during times of year that the system determines the user typically exhibits such wrinkles (e.g., wrinkles directly under the first user's eyes).

As yet another example and where skin tone/color might also be used for facial recognition, a skin tan or skin tone the first user might exhibit owing to sun exposure during summer months and even the month of July in particular may be applied to the first user's base template or enrolled face for authentication during those months. Skin lesions such as freckles may also be applied to the first user's enrolled face data.

Figure 4:
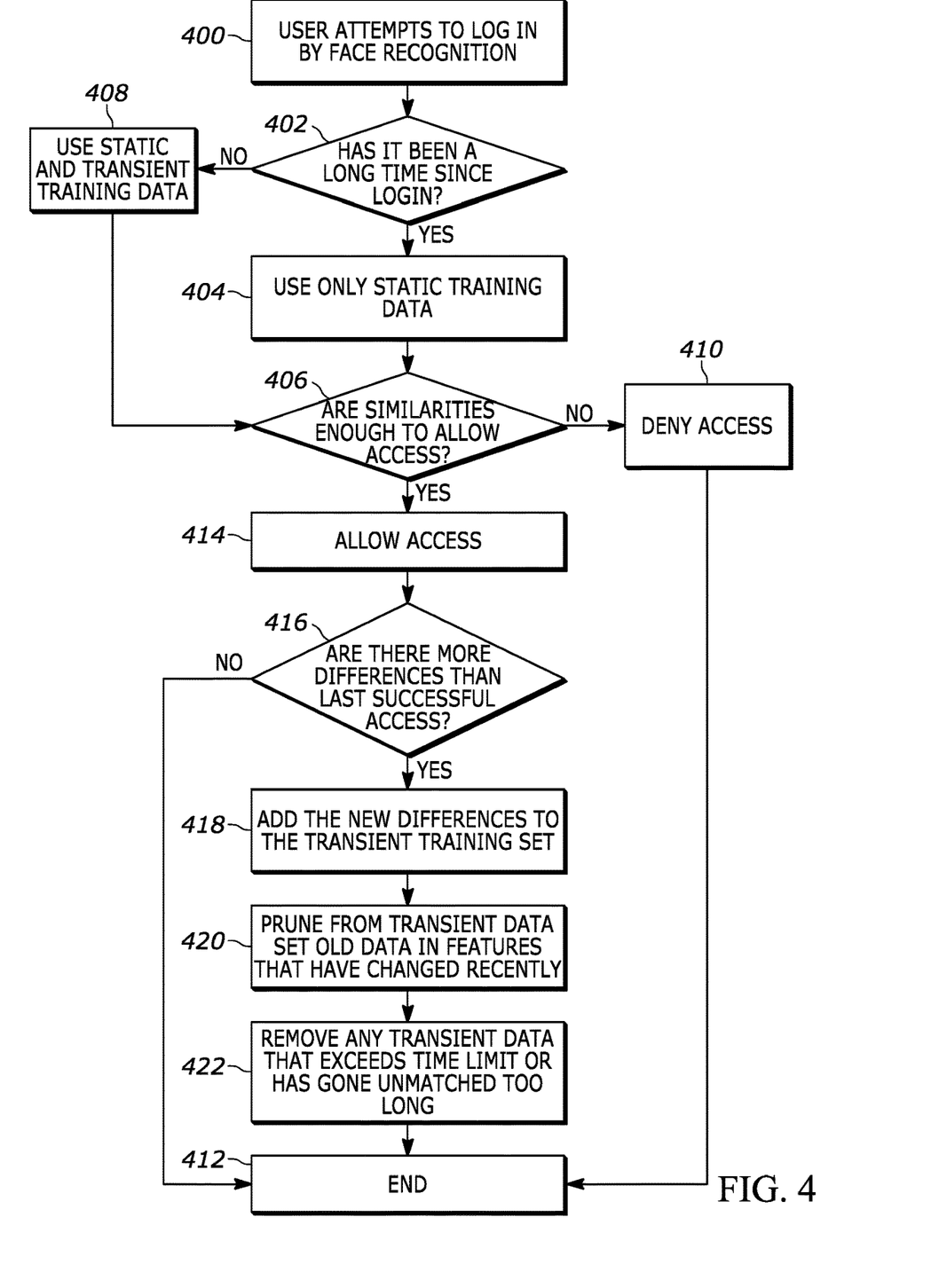

Now in reference to FIG. 4, it also shows example logic that may be executed by a device such as the system 100 in accordance with present principles for authenticating a first user via facial recognition. The logic of FIG. 4 may be executed by a server and/or an end-user's device. Additionally, it may be executed in conjunction with or separate from the logic of FIG. 3 in various examples.

Beginning at block 400, the device may attempt to authenticate and log the first user into a resource or other item (e.g., email account, secure building, etc.) based on input from a camera indicating the face of the first user. From block 400 the logic may then proceed to decision diamond 402 where the device may determine whether the first user has not had a successful login for at least a threshold amount of time. Responsive to an affirmative determination at diamond 402, the logic may proceed to block 404 where the device may attempt to use only static facial training data to authenticate the first user to log the first user in, such as only using a base facial template or previously enrolled face data as set forth above. From block 404 the logic may proceed to decision diamond 406, which will be described shortly.

However, before describing diamond 406, note that a negative determination at diamond 402 may instead cause the logic to proceed to block 408 rather than block 404. At block 408 the device may use both static and transient training data to attempt to authenticate the user and log the first user in, such as using the base facial template or enrolled face data as set forth above and using certain time-variant data for the first user as set forth above. From block 408 the logic may then proceed to decision diamond 406.

At diamond 406 the device may determine whether there are enough similarities between the first user's face as indicated in the camera input and either the static training data or both the static training data and the transient training data. The determination at diamond 406 may be based on a threshold level of confidence in a match, and/or based on a match to within a threshold distance. Responsive to a negative determination at diamond 406, the logic may proceed to block 410 where the device may decline to authenticate the first user and deny the first user access to the resource. The logic may then proceed to block 412 where the logic may end.

However, note that responsive to an affirmative determination at diamond 406 the logic may instead proceed to block 414 where the device may authenticate the first user and provide the first user with access to the resource, e.g., through the first user's own device (e.g., laptop or smart phone). From block 414 the logic may then proceed to decision diamond 416. At diamond 406 the device may determine whether the first user's face as shown in the input from the camera exhibits differences relative to the last time the first user was successfully authenticated.

A negative determination at diamond 416 may cause the logic to proceed to block 412 where the logic may end. However, an affirmative determination at diamond 416 may instead cause the logic to proceed to block 418. At block 418 the device may add the newly determined differences to the transient training set. For example, the device may add new time-variant data to the second facial recognition database discussed above while associating the new time-variant data with the first user and providing a timestamp for when the new time-variant data was collected.

From block 418 the logic may then move to block 420. At block 420 the device may prune/delete old data from the transient data set/second facial recognition database. The device may do so by determining transient/time-variant data that does not match any transient data of the first user identified based on the input from the camera that just resulted in authentication. From block 420 the logic may then proceed to block 422 where the device may prune or remove transient data from the transient data set/second facial recognition database that either is older than a threshold amount of time and/or has not been used to authenticate the first user for at least a threshold amount of time (e.g., thirty days). From block 422 the logic may then proceed to block 412 where the logic may end.

Note however that notwithstanding the pruning discussed above in relation to blocks 420 and 422, certain types of transient data may not be pruned. For example, transient data related to inanimate objects the user might be wearing in any given instance may not be pruned, such as hair clips, electronic Bluetooth headsets, glasses, etc. Also note that individual lens patterns for eyeglasses may establish transient data recognizable by the device that may not be pruned.

Figure 5:
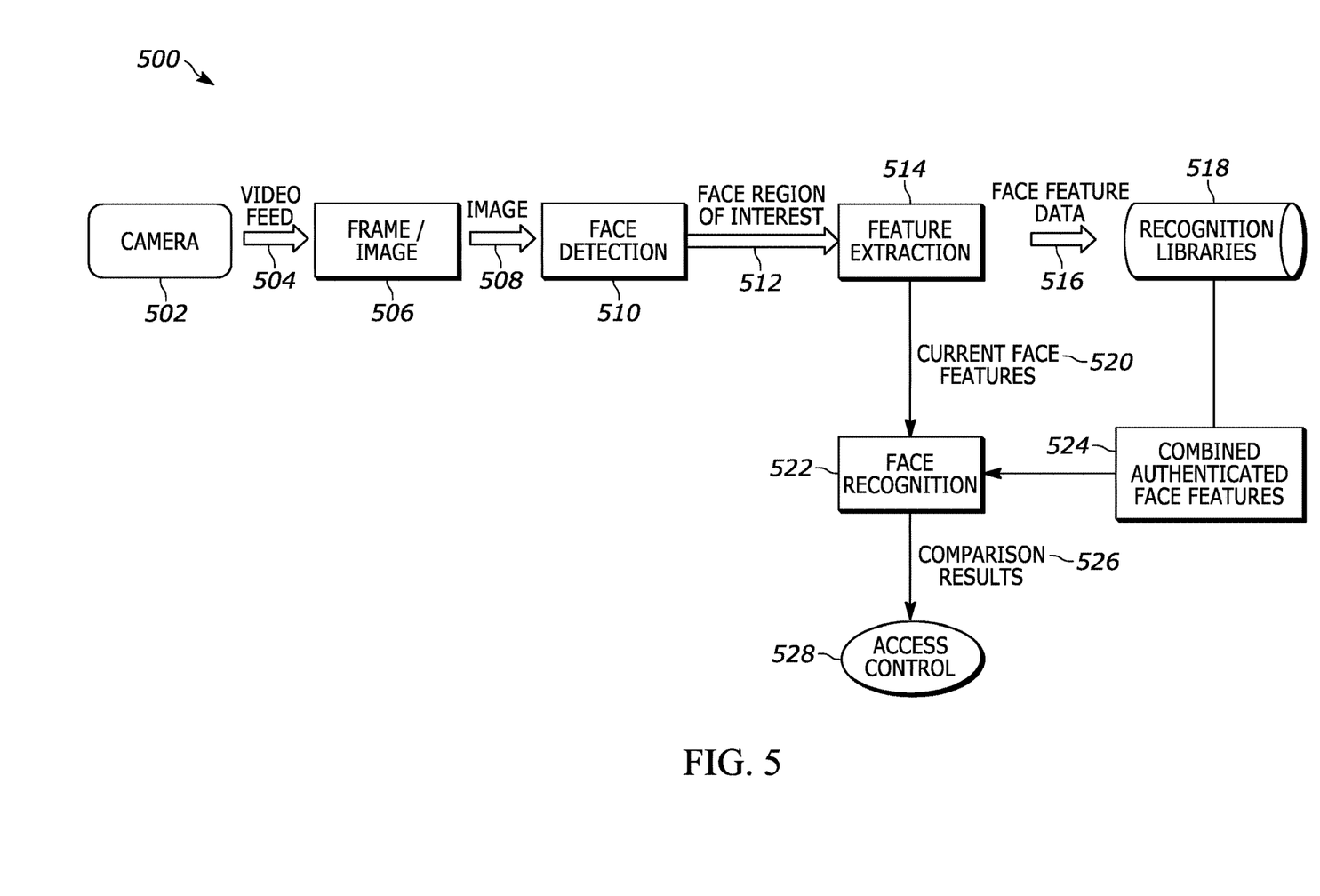
FIG. 5 shows a block diagram of artificial intelligence architecture that may be used consistent with present principles.

Continuing the detailed description in reference to FIG. 5, it shows an example block diagram of artificial intelligence (AI) architecture 500 that may be used consistent with the logic of FIGS. 3 and 4 for facial recognition. The architecture 500 may therefore be embodied in one or more of the devices disclosed herein.

Also note that the AI architecture 500 may use one or more recurrent or deep neural networks for making inferences for facial recognition and may be trained in supervised or unsupervised fashion to better-recognize a user each time the user attempts authentication via facial recognition. Thus, one or more classification algorithms may be used for training, as an example.

As shown in FIG. 5, a camera 502 may provide a video feed 504 as input to a frame/image module 506. The frame/image module 506 may then extract an image 508 from the video feed 504 and provide it as input to a face detection module 510. The face detection module 510 may then extract facial regions of interest 512 from the image 508 and provide the regions of interest 512 as input to a feature extraction module 514.

The feature extraction module 514 may determine face feature data 516 from the regions of interest 512 and add them to recognition libraries 518 that may be respectively established by the first and second facial recognition databases disclosed above such that a face indicated in the face feature data 516 may be enrolled into the first facial recognition database and time-variant data may be added to the second facial recognition database for future authentications.

As also shown in FIG. 5, to perform authentication in the present instance, the feature extraction module 514 may also provide current face features 520 determined from the regions of interest 512 as input to a face recognition module 522, which may also receive combined authenticated face features 524 indicating both previously enrolled face data or a face template and also time-variant data for a user that was collected during a past authentication. The face recognition module 522 may then output comparison results 526 regarding whether the current face features 520 match the combined, previously authenticated face features 524, e.g., to a threshold level of confidence. Based on a match to the threshold level of confidence, access control 528 may be provided to allow the user access to an electronic system/resource such as an email account, an electronic banking system, a particular device (e.g. smart phone), etc.

Figure 6:
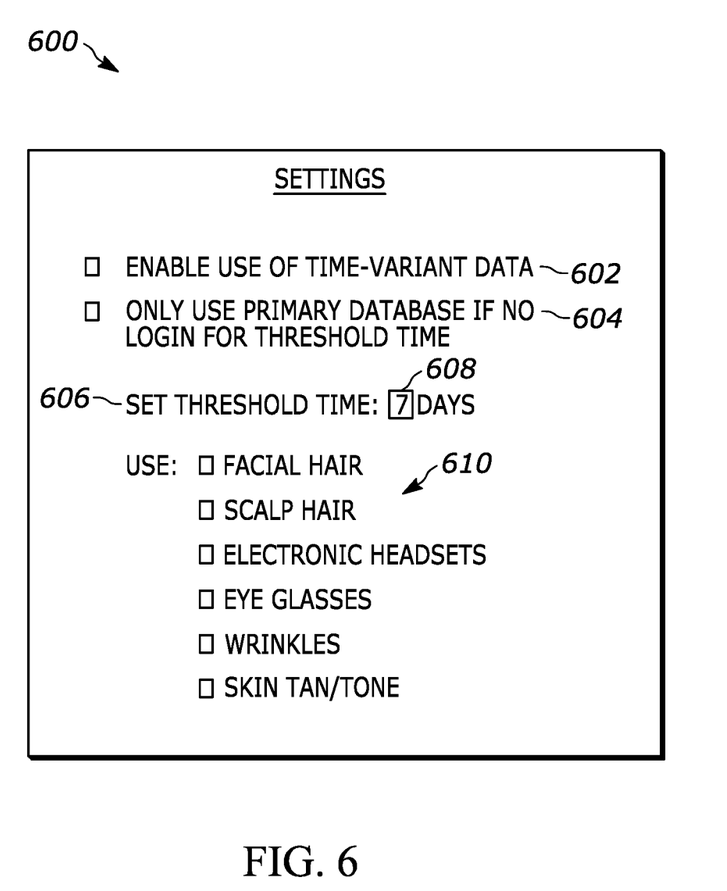
FIG. 6 shows an example graphical user interface (GUI) for configuring one or more settings of a device operating consistent with present principles.

Continuing the detailed description in reference to FIG. 6, it shows an example graphical user interface (GUI) 600 that may be presented on the display of a system administrator's device or end-user's device to configure one or more settings of a facial recognition system operating consistent with present principles. It is to be understood that each of the options that will be discussed below may be selected by directing touch or mouse input to the respective check box shown adjacent to the respective option.

As shown, the GUI 600 may include a first option 602 selectable to configure one or more devices to perform facial recognition as disclosed herein. For example, the option 602 may be selected to configure the device(s) to execute the logic of FIGS. 3 and 4 as well as the operations described above with respect to FIG. 5.

The GUI 600 may also include an option 604 that is selectable to configure the device(s) to only use the first facial recognition database discussed above and its associated base templates or enrolled face data if a given user has not attempted or successfully logged in for at least a threshold amount of time, rather than also using the second facial recognition database discussed above. The GUI 600 may even include a setting 606 at which the user/administrator may set the threshold amount of time by directing input to input box 608. In this case, an administrator has set the threshold amount of time to seven days.

The GUI 600 may also include various options 610 for the administrator to select various types of time-variant data for the device(s) to use consistent with present principles. As shown, in this example options 610 may be provided for using facial hair, scalp hair, electronic headsets, eyeglasses, wrinkles, and skin tan and/or tone.

It may now be appreciated that present principles provide for an improved computer-based user interface that improves the functionality and ease of use of the facial recognition devices disclosed herein. The disclosed concepts are thus rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
at least one processor; and
storage accessible to the at least one processor and comprising instructions executable by the at least one processor to:
receive input from a camera indicating a first face of a first user;
access a first facial recognition database comprising non-time-variant facial data from facial recognition enrollment of one or more users;
access a second facial recognition database indicating time-variant data related to one or more faces and indicating timestamps for the time-variant data;
identify a current time metric;
select first time-variant data associated with the first user from the second facial recognition database based on the current time metric and a first timestamp indicated in the second facial recognition database; and
based on the first time-variant data and non-time-variant enrolled facial data for the first user identified from the first facial recognition database, attempt to authenticate the first user.

2. The device of claim 1, wherein the instructions are executable by the at least one processor to:
prior to accessing the second facial recognition database, attempt to authenticate the first user using the input from the camera and the first facial recognition database but not the second facial recognition database;
responsive to authenticating the first user to a threshold level of confidence using the first facial recognition database but not the second facial recognition database, permit the first user access to at least one resource; and
responsive to not authenticating the first user to the threshold level of confidence using the first facial recognition database but not the second facial recognition database, access the second facial recognition database, identify the current time metric, select the first time-variant data, and attempt to authenticate the first user based on the first time-variant data and the non-time-variant enrolled facial data for the first user identified from the first facial recognition database.

3. The device of claim 1, wherein the second facial recognition database does not comprise templates of faces or non-time-variant facial enrollment data, the second facial recognition database indicating facial features as differences related to templates of faces or enrolled facial data in the first facial recognition database.

4. The device of claim 1, comprising the camera.

5. The device of claim 1, wherein the instructions are executable by the at least one processor to:
responsive to successful authentication of the first user, train at least one artificial neural network used for facial recognition using second time-variant data related to the face of the first user as indicated in the input from the camera.

6. The device of claim 3, wherein the first time-variant data relates to facial hair.

7. The device of claim 3, wherein the first time-variant data relates to scalp hair.

8. The device of claim 3, wherein the first time-variant data relates to electronic headsets.

9. The device of claim 3, wherein the first time-variant data relates to eyeglasses.

10. The device of claim 3, wherein the first time-variant data relates to wrinkles and/or injury-related skin changes.

11. The device of claim 3, wherein the first time-variant data relates to skin tan, skin tone, and/or pigmented lesions.

12. The device of claim 5, wherein the instructions are executable by the at least one processor to:
prune third time-variant data from the second facial recognition database, the third time-variant data being related to the first user.

13. The device of claim 12, wherein the third time-variant data is pruned responsive to authentication of the first user based on the first time-variant data.

14. The device of claim 12, wherein the third time-variant data is pruned based on the third time-variant data being older than a threshold amount of time.

15. The device of claim 12, wherein the third time-variant data is pruned based on the third time-variant data not being used for authentication for at least a threshold amount of time.

16. The device of claim 12, wherein the third time-variant data is pruned based on the third time-variant data being dissimilar from the second time-variant data by a threshold distance.

17. A method, comprising:
receiving input from a camera indicating a first face of a first user;
accessing first facial recognition data indicating one or more enrolled faces;

accessing second facial recognition data indicating time-variant data, the second facial recognition data not establishing enrolled face data;

selecting first time-variant data associated with the first user from the second facial recognition data based on a current time; and based on the first time-variant data and non-time-variant enrolled face data for the first user identified from the first facial recognition data, authenticating the first user.

18. The method of claim 17, comprising:

based on identifying that the first user has not been authenticated for at least a threshold amount of time, attempting to authenticate the first user using the non-time-variant enrolled face data for the first user but not the first time-variant data.

19. The method of claim 17, comprising:

responsive to the authenticating of the first user, adding second time-variant data identified from the input from the camera to the second facial recognition data.

20. At least one computer readable storage medium that is not a transitory signal, the computer readable storage medium comprising instructions executable by at least one processor to:

receive input from a camera indicating a first face of a first user;

access first facial recognition data indicating one or more enrolled faces;

access second facial recognition data indicating time-variant data, the second facial recognition data not establishing non-time-variant face data;

select first time-variant data associated with the first user from the second facial recognition data; and based on the first time-variant data and enrolled face data for the first user identified from the first facial recognition data, authenticate the first user.

* * * * *